United States Patent [19]

Marwin et al.

[11] Patent Number: 4,992,717
[45] Date of Patent: Feb. 12, 1991

[54] STEPPER MOTOR DRIVE CIRCUIT

[75] Inventors: Gregg A. Marwin, Douglaston; Tom Mazz, Huntington Station, both of N.Y.

[73] Assignee: Symbol Technologies, Inc., Bohemia, N.Y.

[21] Appl. No.: 382,722

[22] Filed: Jul. 19, 1989

[51] Int. Cl.$^5$ .............................................. H02P 8/00
[52] U.S. Cl. ................................... 318/696; 318/685; 235/462; 235/467; 235/472
[58] Field of Search ................ 318/696, 685; 235/462, 235/467, 472

[56] References Cited

U.S. PATENT DOCUMENTS

| | | | |
|---|---|---|---|
| 3,631,274 | 12/1971 | Stauder | 310/66 |
| 3,636,317 | 1/1972 | Torrey | 235/61.12 N |
| 3,774,014 | 11/1973 | Berler | 235/61.11 E |
| 3,818,467 | 6/1974 | Willis | 340/224 |
| 4,025,761 | 5/1977 | Hayosh et al. | 235/61.11 E |
| 4,041,322 | 8/1977 | Hayosh et al. | 250/568 |
| 4,387,297 | 6/1983 | Swartz et al. | 235/462 |
| 4,496,831 | 1/1985 | Swartz et al. | 235/472 |
| 4,593,186 | 6/1986 | Swartz et al. | 235/472 |
| 4,612,588 | 9/1986 | Tsukahara | 318/696 X |

Primary Examiner—William M. Shoop, Jr.
Assistant Examiner—Saul M. Bergmann

[57] ABSTRACT

A drive circuit excites a stepper motor. A current steering network alternately conducts current through first one and then the other of a set of AC windings. A regulated current source excites the DC windings of the stepper motor such that magnitude of the resultant vector due to the current in the motor is substantially constant in time.

14 Claims, 3 Drawing Sheets $i_A(t) + i_B(t) + i_C(t) = I_t = \text{CONSTANT (ALL } t\text{)}$ $$\vec{R(t)} = k\,[i_C(t)\hat{y} + i_A(t)\hat{u} + i_B(t)\hat{w}] = |R(t)|\angle\theta(t)$$

WHERE $\hat{u} = 1\angle 18° = 0.31\hat{x} + 0.95\hat{y}$ $\hat{w} = 1\angle{-18°} = -0.31\hat{x} + 0.95\hat{y}$ $$|R(t)| = \sqrt{[i_C(t) + 0.95(i_A(t) + i_B(t))]^2 + [0.31 i_A(t) - 0.31 i_B(t)]^2}$$

$$\theta(t) = \tan^{-1}\left[\frac{0.31(i_A(t) - i_B(t))}{i_C(t) + 0.95(i_A(t) + i_B(t))}\right]$$

STEPPER MOTOR DRIVE CIRCUIT

REFERENCE TO RELATED APPLICATIONS

This application is related to U.S. patent applications Ser. Nos. 322,188, 428,834 and 465,980 assigned to Symbol Technologies Inc.

BACKGROUND OF THE INVENTION

1. Field of the Invention

The present invention relates generally to stepper motor drive circuits and, more particularly, to a circuit and a method for driving a stepper motor in an oscillating mode that is useful as the scan element in a bar-code laser scanner.

2. Prior Art

Bar-code laser scanners have employed stepper motors as scanning elements. A scanning mirror attaches to the shaft of the stepper motor and, as the stepper motor oscillates about the axis of its shaft, the scanning mirror intercepts an incident laser beam and scans it back-and-forth across a bar code.

Such a scheme requires some sort of drive circuit to cause the stepper motor to oscillate or reciprocate about its axis. Known drive circuits have suffered in that they scanned the laser beam spot at different speeds at the extreme ends of the scan than at the center of the scan, that scanning speed varied from one extreme of the scan to the other, and that scan speed varied from the forward direction to the reverse direction. These speed variations may be referred to as variations in the scan-speed profile.

Bar-code laser scanners receive the laser light reflected from the bar code, convert the reflected laser light into an analog signal, and convert the analog signal into a usable digital value indicative of the bar code. This interpretation of the returned signal requires a decode algorithm. The variations in the scan-speed profile may require more scans to yield a proper interpretation by the decode algorithm.

It is therefore desirable to have a stepper motor driven by a circuit that creates a substantially more constant higher net torque on the permanent magnet rotor of the stepper motor, which yields a more constant, symmetric scan-speed profile in both forward and reverse directions. It is also desirable to have a stepper motor driven in a constant scan-speed profile at all points in the scan.

It is often desirable to use a bar-code laser scanner in a portable, battery-operated scanning system. Such a scanner should therefore minimize power-drain on the battery and known systems have drawn an undesirably large amount of power from their power sources. It is therefore also desirable to reduce the power drain of the stepper motor.

SUMMARY OF THE INVENTION

The present invention provides an electrical circuit that drives a stepper motor. The circuit impresses a time varying signal, derived from an alternating current waveform, across the AC and DC windings of the stepper motor. In this way, the magnitude of the resultant vector due to the total current in the windings of the motor (and thus the torque developed) remains substantially constant with time. As used herein, "substantially constant" means that the resultant vector varies only slightly with time, in a preferred embodiment no more than approximately 1.2%.

DETAILED DESCRIPTION OF A PREFERRED EMBODIMENT

Figure 1:
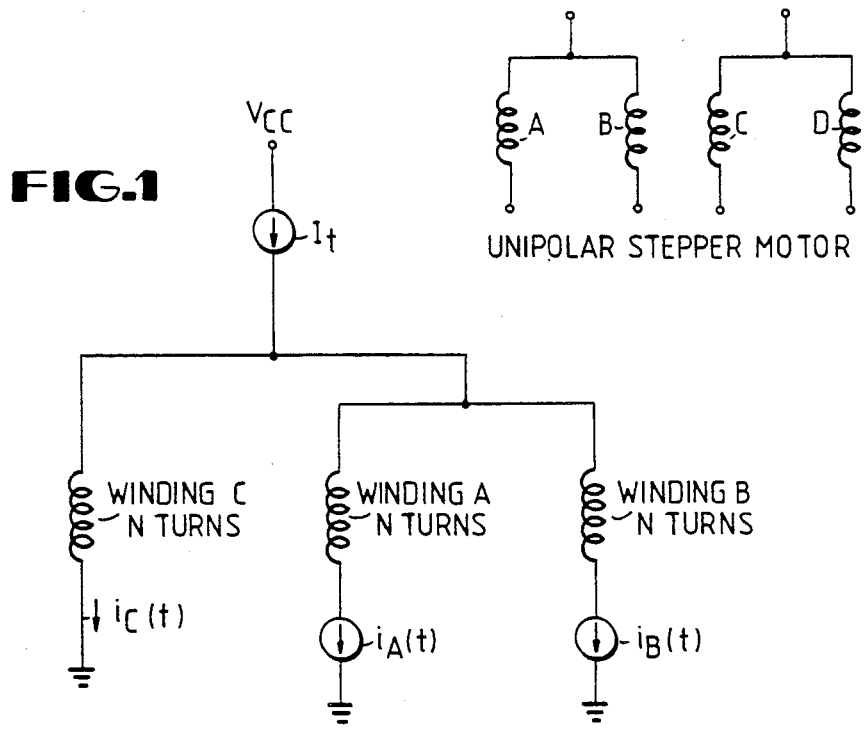
FIG. 1 is a block diagram of the drive circuit of the present invention.
Figure 3:
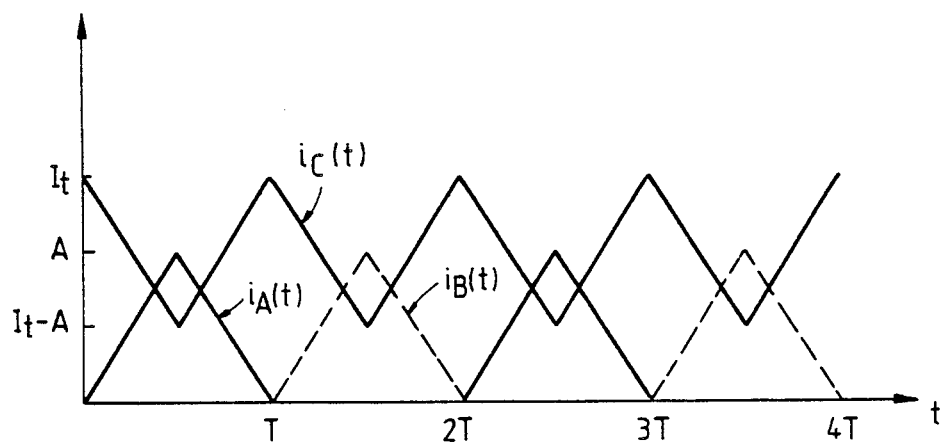
FIG. 3 is a waveform diagram of various currents employed in the present invention.
Figure 2:
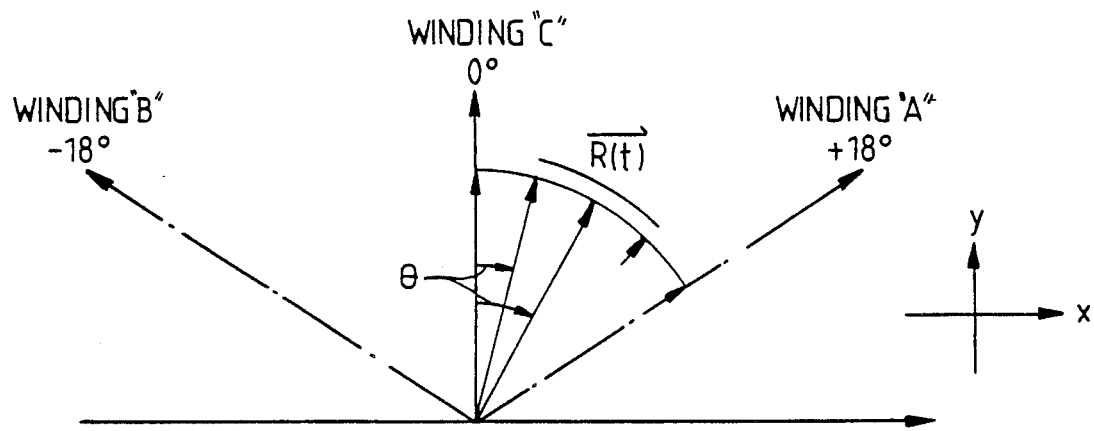
FIG. 2 is a diagram of the resultant vector in the stepper motor using the present invention.

FIGS. 1, 2, and 3 illustrate the basis of the present invention. As shown in FIG. 1, the drive circuit excites the windings A–D of a unipolar stepper motor. A set of currents $i_A(t)$ and $i_B(t)$ alternately excites a set of windings A and B. Another current $i_C(t)$ excites what would normally be a DC winding C of the unipolar stepper motor. If the current $i_C(t)$ excites the entire DC winding, the amplitude of $i_C(t)$ can be halved. In the present invention, if only windings A, B and C are used, the sum of the currents $i_A(t)$, $i_B(t)$, and $i_C(t)$ remains a constant with time. If all windings A–D are used, the total current in the motor will be a time varying waveform, but the magnitude of the resultant vector will substantially be a constant, as described below with respect to FIG. 2. FIG. 1 illustrates the present invention embodied in a unipolar stepper motor but other motors, such as bipolar motors, can be used.

As shown in FIG. 2, the resultant vector for any moment in time is given by $$R(t) = k[i_C(t)\hat{y} + i_A(t)\hat{u} + i_B(t)\hat{w}] \quad (1)$$
$$= |R(t)| \angle \theta(t) \quad (2)$$

where
$\hat{u} = 1/18\text{degrees} = 0.31\hat{x} + 0.95\hat{y}$
$\hat{w} = 1/-18\text{degrees} = -0.31\hat{x} + 0.95\hat{y}$ $$|R(t)| = \sqrt{[i_C(t) + 0.95[i_A(t) + i_B(t)]]^2 + [0.31i_A(t) - 0.31i_B(t)]^2} \quad (3)$$

$$\theta(t) = \tan^{-1}\frac{0.31(i_A(t) - i_B(t))}{i_C(t) + 0.95(i_A(t) + i_B(t))} \quad (4)$$

The scan angle of 18° is merely shown as illustrative. Other scan angles are, of course, possible, depending on the desired application. As shown in FIG. 2, the length of the vector R(t) is nearly constant in time.

FIG. 3 illustrates a preferred set of current waveforms $i_A(t)$, $i_B(t)$, $i_C(t)$. These currents may be generated by any manner known in the art. However, the sum of the currents in the windings, $I_t$, is constant.

The use of a time-varying current to generate the centering torque provides a nearly constant resultant vector over a scan interval. Using equation (3) and normalized values (unity amplitude) for $i_c(t)$ and $i_A(t)$, maximum variation in the magnitude of R(t) occurs where $i_c(t)$ and $i_A(t)$ are equal (i.e., 0.5). Using these values for the currents in equation (3) yields 0.988; that is, the resultant vector varies in magnitude by no more than approximately 1.2% over a scan interval.

The numerical terms in equation (3), 0.95 and 0.31, result from the choice of the 18° scan angle. The 0.95 term is the cosine of 18° and 0.31 is the sine of 18°, the scan angle. However, even a 30° scan angle (cosine 30°=0.866; sine 30°=0.5) results in a maximum variation in the magnitude of the resultant vector of only 3.4% in using the present invention. Those of skill in the bar-code scanning art will recognize that they can choose an angle of scan within the tolerances of the variation in scan torque for proper scanner decode operation.

Figure 4:
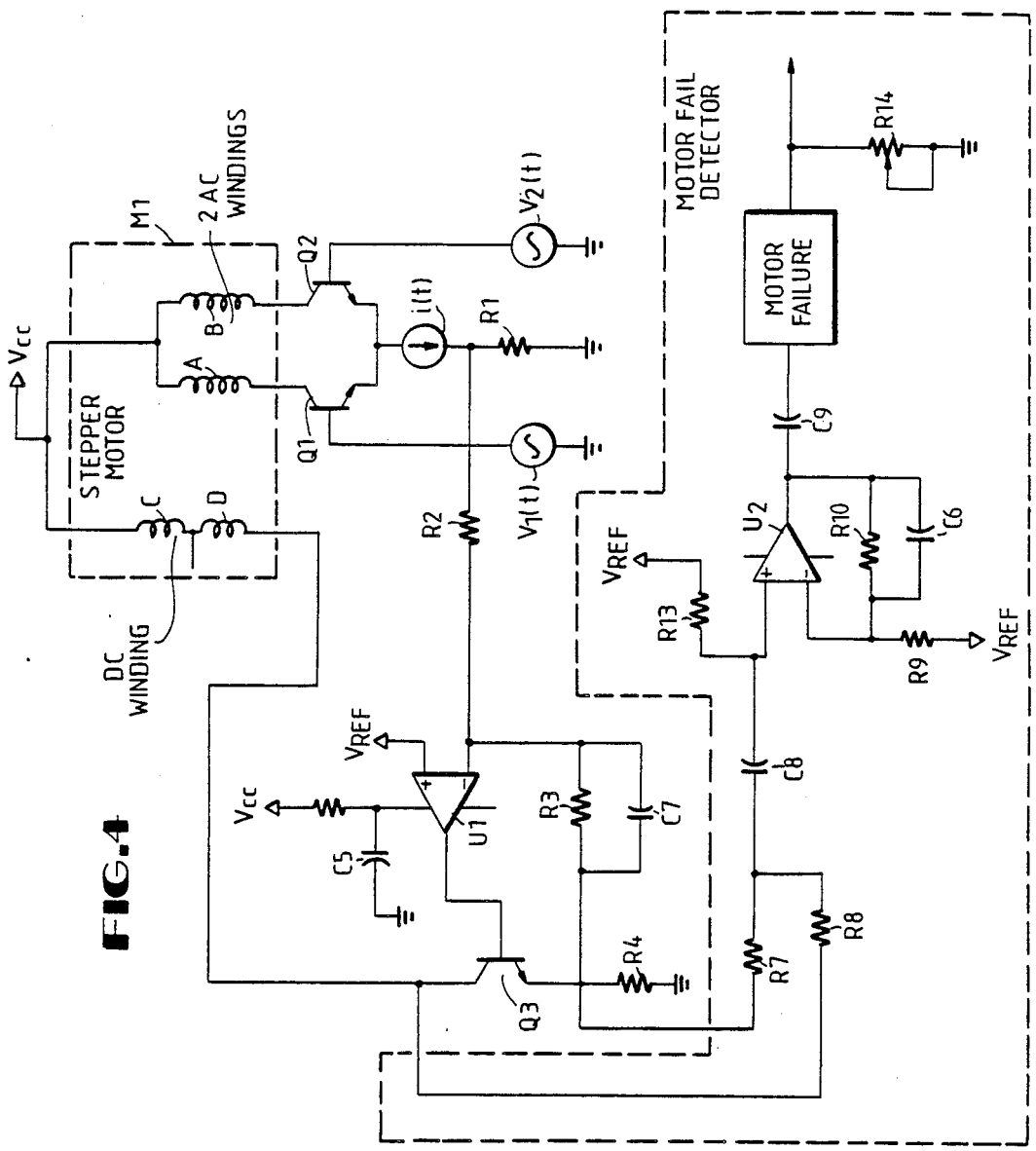
FIG. 4 is a detailed schematic diagram of the drive circuit of the present invention.

FIG. 4 depicts a preferred embodiment of the present invention. The basic element for generating the drive waveforms is depicted as a current source i(t). Table 1 lists preferred circuit element values. As used herein, the term "current source" refers to any appropriate means of generating the proper current waveforms in the motor windings.

A pair of transistors Q1 and Q2 alternately conduct current through a set of AC windings A and 8 of a stepper motor M1. The transistors $Q_1$ and $Q_2$ form a current steering network to steer i(t) between the windings A and B. Thus, only one of the AC windings of the stepper motor M1 is excited at a time. Exciting winding A causes the rotor of the stepper motor M1 to move to the left of center and exciting winding 8 causes the rotor to move to the right. The desired triangle wave voltage is generated by the current source i(t). The frequency and amplitude of i(t) are selected to provide the desired scan-speed profile.

A set of waveforms $V_1(t)$ and $V_2(t)$ act as clocks to alternately switch on the transistors $Q_1$ and $Q_2$. The clocks $V_1(t)$ and $V_2(t)$ thus alternately switch the current i(t) between the windings A and B. This develops the waveforms $i_A(t)$ and $i_B(t)$ shown in FIG. 3.

An amplifier U1 and a pair of transistors R2 and R3 invert and halve the signal from the current source i(t). A reference voltage, $V_{ref}$, at the non-inverting input of U1 provides the proper DC offset correction voltage, shown as A in FIG. 3. The amplifier U1, a transistor Q3 and resistors R3 and R4 form a regulated current source to drive the DC winding of the stepper motor M1.

The drive circuit may preferably include a motor fail detector. A circuit to detect motor failure is comprised of resistors R7, R8, R9, and R10, a capacitor C6, and an amplifier U2. The voltage across the DC winding consists of three components: an ohmic drop (triangle wave), a transformer induced voltage from the AC winding, and a speed electromotive force (emf) due to interaction with the permanent magnet rotor. The circuitry subtracts out the ohmic drop. The remaining DC voltage is blocked by a capacitor C8. The remaining speed emf plus transformer voltage is amplified in the amplifier U2. Motor failure is detected by monitoring the speed emf and detecting when it falls below a preset threshold set by a resistor R14.

Although the invention has been described with reference to specific embodiments, these embodiments should not be construed as limiting the scope of the invention. It will be clear to those skilled in the art with the benefit of this disclosure that certain modifications can be made without deviating from the spirit of the invention.

TABLE 1

| Resistors (Ohms) | | |
| --- | --- | --- |
| R1 | 12.1 | (1%) |
| R2 | 100K | (1%) |
| R3 | 49.9K | (1%) |
| R4 | 12.1 | (1%) |
| R7 | 10K | (1%) |
| R8 | 100K | (1%) |
| R9 | 10K | |
| R10 | 100K | |
| R13 | 1 M | |
| R14 | 50K | |
| Capacitors (Microfarads) | | |
| C5 | 0.1 | |
| C6 | .022 | |
| C7 | .015 | |
| C8 | .01 | |
| C9 | 0.1 | |
| Miscellaneous | | |
| Q1–Q3 | 2N3904 | |
| U1–U2 | 358 | |

We claim:

1. An electric motor drive circuit comprising:
   a. a first periodic current source, the first current source alternately exciting a first and second winding of the motor; and
   b. a second periodic current source, the second current source being 180 degrees out of phase with the first current source, the second current source exciting a third winding of the motor, and the sum of the currents from the first and second current sources developing a resultant vector of substantially constant magnitude.

2. A motor drive circuit comprising:
   a. first and second AC windings;
   b. a first switch coupled to the first AC winding and a second switch coupled to the second AC winding;
   c. a first current source coupled to the switches;
   d. means for alternately switching the current from the first current source between the first and second AC windings;
   e. a pair of DC windings coupled in series; and
   f. a second current source coupled to the DC windings such that the magnitude of the resultant vector due to the currents in the AC windings and the DC windings is substantially constant with time.

3. The motor drive circuit of claim 2 wherein the first switch and the second switch are transistors.

4. The motor drive circuit of claim 2 wherein the second current source comprises an operational amplifier and a transistor driven by the first current source.

5. A method of driving a stepper motor comprising the steps of alternately exciting a first and a second AC winding of the motor and exciting a DC winding of the motor with a current that provides a substantially constant resultant vector due to the current in the windings of the motor.

6. A circuit for driving a stepper motor comprising:
   a. first, second, third, and fourth windings;
   b. a first switch connected to one end of the first winding;
   c. a second switch connected to one end of the second winding, the other ends of the first and second windings being coupled together and to a source of excitation;
   d. a current source connected to the first and second switches;
   e. a clock connected to the first and second switches for opening and shutting the first and second switches alternately; and f. an amplifier coupled between the current source and the third and fourth windings providing a substantially constant magnitude resultant vector due to the sum of the currents in the windings.

7. The circuit of claim 6 wherein the switches are transistors.

8. The circuit of claim 6 wherein the amplifier is an operational amplifier coupled to a transistor and wherein the amplifier provides a periodic current with an impressed DC level to the third and fourth windings.

9. A laser scanner for reading symbols comprising:
 a. a laser light source mounted in the scanner and operative for generating an incident laser beam;
 b. a scanning mirror mounted in the scanner;
 c. a scan drive means including an electric motor drive circuit mounted in the scanner for moving the scanning mirror and for sweeping the incident laser beam in a scan across the symbol, the returning portion of the reflected laser light having a variable intensity over the scan, the scan drive circuit comprising:
  i. a first periodic current source, the first current source alternately exciting a first and second winding of the motor; and
  ii. a second periodic current source, the second current source being 180° out of phase with the first current source, the second current source exciting a third winding of the motor, and the sum of the currents from the first and second current sources developing a resultant vector of substantially constant magnitude;
 d. means mounted in the scanner for receiving the variable intensity of the returning portion of the reflected laser light over a field of view, and for generating an electrical analog signal indicative of the detected variable light intensity; and
 e. a signal processor mounted in the scanner for processing the analog electrical signal, and for generating a digital value indicative of the symbol.

10. An optical component for use in optical scanning systems of the type having a light source and a light receiver, and operative for reading indicia having parts of different light reflectivity, comprising:
 (a) a stepper motor having a shaft;
 (b) a scanning mirror attached to the shaft
  (i) for reflecting light from the light source to the indicia parts in a scan across the indicia parts, thereby reflecting light of the variable light intensity off the indicia parts,
  (ii) for collecting at least a portion of the light reflected off the indicia parts, and
  (iii) for directing the collected portion of light to the light receiver; and
 (c) an electric motor drive circuit for moving the shaft and the attached scanning mirror, the means for moving comprising:
  i. a first periodic current source, the first current source alternately exciting a first and second winding of the motor; and
  ii. a second periodic current source, the second current source being 180° out of phase with the first current source, the second current source exciting a third winding of the motor, and the sum of the currents from the first and second current sources developing a resultant vector of substantially constant magnitude.

11. The component as recited in claim 10, wherein the motor is operative for reciprocally and repetitively oscillating the shaft in alternate circumferential directions over arc lengths less than 360° and at a rate of speed on the order of a plurality of oscillations per second.

12. The component as recited in claim 10, wherein the light source is a laser source, and wherein the indicia constitute bar code symbols.

13. A laser scanner for reading symbols comprising:
 a. a laser light source mounted in the scanner and operative for generating an incident laser beam;
 b. a scanning mirror mounted in the scanner;
 c. a scan drive means including an electric motor drive circuit mounted in the scanner for moving the scanning mirror and for sweeping the incident laser beam in a scan across the symbol, the returning portion of the reflected laser light having a variable intensity over the scan, the scan drive circuit comprising:
  i. first and second AC windings;
  ii. a first switch coupled to the first AC winding and a second switch coupled to the second AC winding;
  iii. a first current source coupled to the switches;
  iv. means for alternately switching the current from the first current source between the first and second AC windings;
  v. a pair of DC windings coupled in series; and
  vi. a second current source coupled to the DC windings such that the magnitude of the resultant vector due to the currents in the AC windings and the DC windings is constant with time;
 d. a sensor mounted in the scanner for detecting the variable intensity of the returning portion of the reflected laser light over a field of view, and for generating an electrical analog signal indicative of the detected variable light intensity, said scanning mirror positioned to collect the returning portion of the reflected laser light over the field of view and to direct the collected returning portion to the sensor; and
 e. a signal processor mounted in the scanner for processing the analog electrical signal, and for generating a processed signal indicative of the symbol.

14. In a laser bar code scanner for reading bar code having drive means for reciprocally oscillating a scanning mirror, the drive means including a stepper motor having AC and DC windings, the method of exciting the drive means comprising the steps of alternately exciting a first and a second AC winding of the motor and exciting a DC winding of the motor with a current that provides a constant resultant vector due to the current in windings of the motor.

* * * * *

UNITED STATES PATENT AND TRADEMARK OFFICE
CERTIFICATE OF CORRECTION

PATENT NO. : 4,992,717
DATED : February 12, 1991
INVENTOR(S) : Marwin et al.

It is certified that error appears in the above-identified patent and that said Letters Patent is hereby corrected as shown below:

In column 1, line 44, please insert a comma between the words "constant" and "higher".

In column 3, line 18, please replace "windings A and 8 of a" with --windings A and B of a--.

In column 3, line 24, please replace "exciting winding 8 causes" with --exciting winding B causes--.

Signed and Sealed this

Twenty-eighth Day of April, 1992

Attest:

HARRY F. MANBECK, JR.

*Attesting Officer*  *Commissioner of Patents and Trademarks*